United States Patent [19]
Confer et al.

[11] 3,763,455
[45] Oct. 2, 1973

[54] ELECTRICALLY COUPLED STEERING COLUMN

[75] Inventors: Dale E. Confer, Bridgeport; John W. Creed, Jr.; Harold V. Elliott, both of Saginaw, all of Mich.

[73] Assignee: General Motors Corporation, Detroit, Mich.

[22] Filed: Dec. 17, 1971

[21] Appl. No.: 209,141

[52] U.S. Cl. ............. 339/3 S, 339/5 RL, 242/54 R, 191/12.2 R
[51] Int. Cl. ............................................. H01r 39/00
[58] Field of Search.................... 191/12, 12.2, 12.4; 242/54 R; 339/2 RL, 3, 5, 6 RL, 8 RL, 9 RY

[56] References Cited
UNITED STATES PATENTS

| | | | |
|---|---|---|---|
| 3,525,536 | 8/1970 | Pruneski | 339/3 S X |
| 3,412,951 | 11/1968 | Ober | 191/12.2 R X |
| 1,675,847 | 7/1928 | Fisher | 339/3 S X |
| 3,599,165 | 8/1971 | Wendell et al. | 339/5 M |
| 3,545,693 | 12/1970 | Gurner et al. | 242/54 R |
| 1,446,410 | 2/1923 | Bennett et al. | 242/107.1 |

FOREIGN PATENTS OR APPLICATIONS 703,931   2/1931   France ........................... 191/12.2 R Primary Examiner—Marvin A. Champion
Assistant Examiner—Lawrence J. Staab
Attorney—W. E. Finken et al.

[57] ABSTRACT

In a preferred form, this disclosure relates to an electrical coupling for use with a device having a rotatable member and a non-rotatable member concentric with the rotatable member and in which one of the members has terminal means for being connected to an electrical power source. The coupling includes a pair of flexible electrical connectors each of which has one end fixed to the terminal means of the one member and which are wrapped a plurality of revolutions upon the one member. The connectors are also reversely looped between the members and wrapped a plurality of revolutions upon the other of the members. The connectors each have their other ends fixed to terminal means upon the other member whereby electrical continuity between the members is maintained through a plurality of revolutions of the rotatable member relative to the non-rotatable member.

3 Claims, 6 Drawing Figures

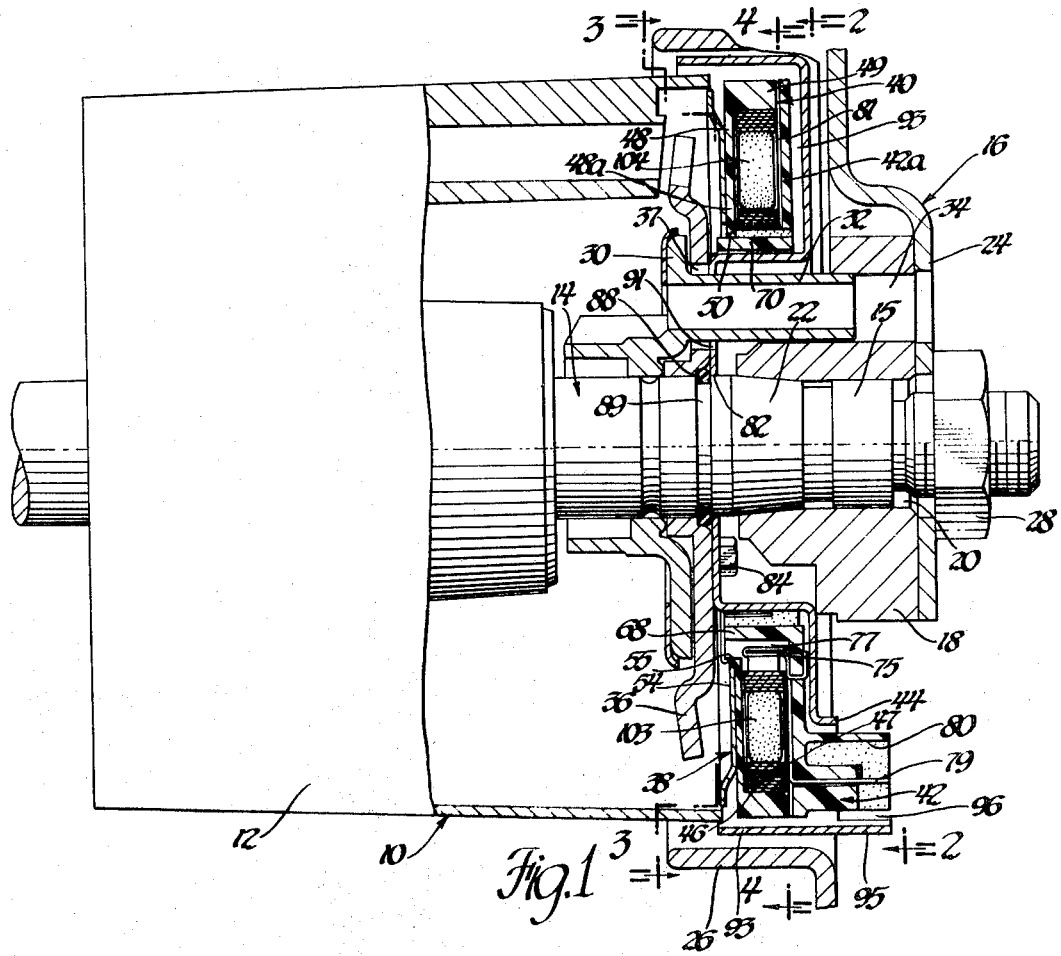
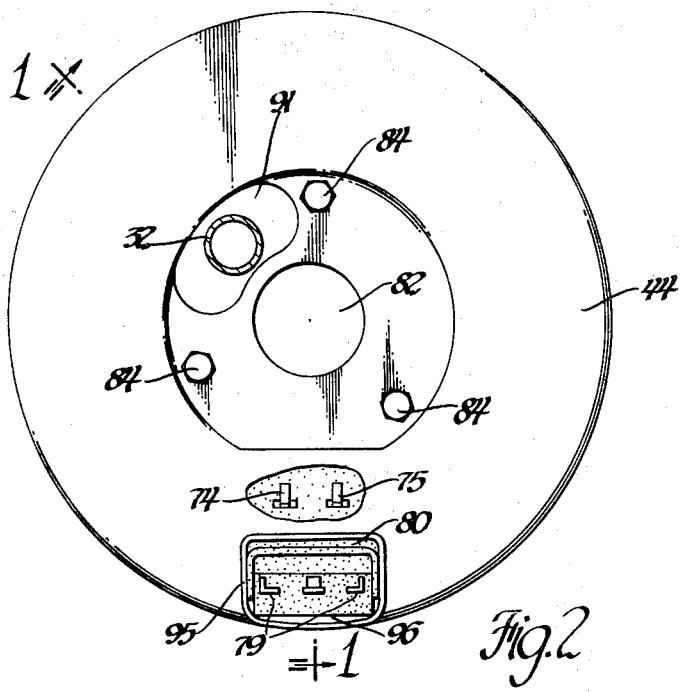
INVENTORS
*Dale E. Confer,*
*John W. Creed, Jr. &*
*Harold V. Elliott*
BY *W.A. Schuetz*
ATTORNEY Patented Oct. 2, 1973
3,763,455
2 Sheets-Sheet 2
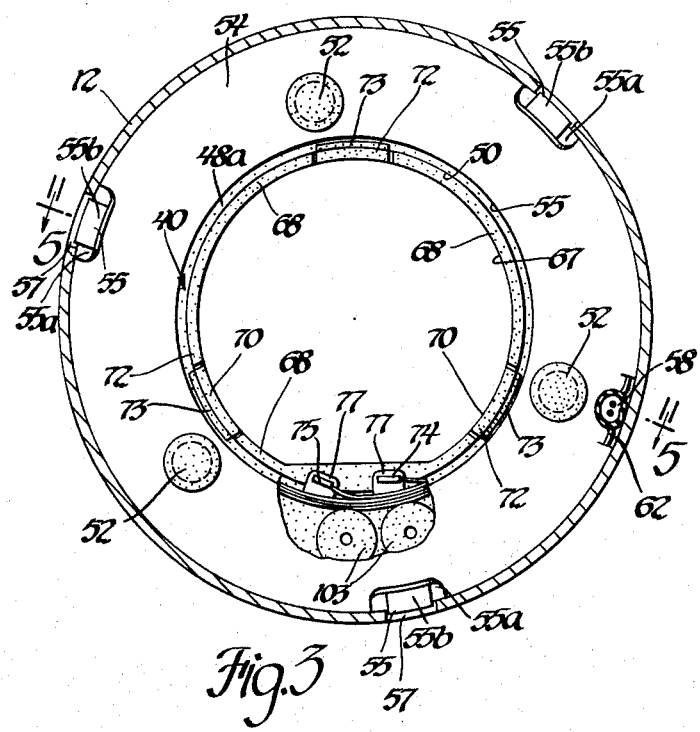
Fig.3
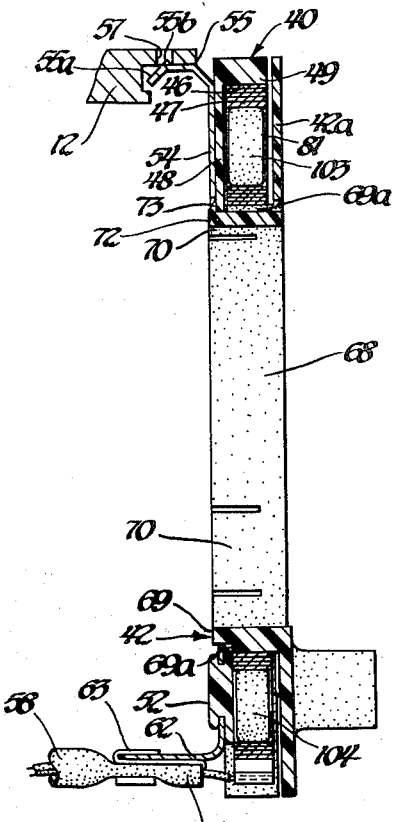
Fig.5
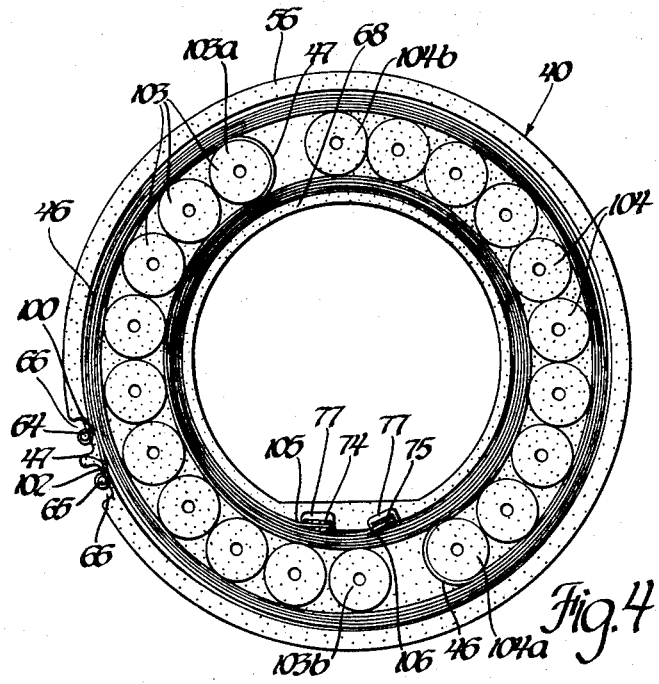
Fig.4
Fig.6
INVENTORS
Dale E. Confer,
John W. Creed, Jr. &
Harold V. Elliott
BY W.A. Schuetz
ATTORNEY

ELECTRICALLY COUPLED STEERING COLUMN

The present invention relates to an electrical coupling, and more particularly to a steering column having an electrical coupling connected to the rotatable and non-rotatable members of the steering column to maintain electrical continuity through a plurality of revolutions of the rotatable steering member of the column.

Electrical couplings have heretofore been provided between concentric rotatable and non-rotatable members of a device wherein the electrical coupling comprises a pair of electrical connectors which are wrapped in opposite directions upon the rotatable member of the device and which are reversely looped around a pair of pulleys to provide for rotary movement of the rotatable member of approximately 330° relative to the non-rotatable member. For example, see U. S. Pat. No. 3,466,588. Electrical couplings have also been provided for vehicle steering columns wherein an electrical connector has one end attached to the steering column, is looped a plurality of revolutions about the steering shaft assembly, and has its other end attached to the steering shaft assembly in order that rotation of the steering shaft assembly in one direction causes a wrapping of the electrical connector upon the steering shaft assembly and rotation of the steering shaft assembly in the other direction causes an unwrapping of the electrical connector from the steering shaft assembly. For example, see U. S. Pat. No. 3,525,536. Problems can be encountered in the design of the electrical coupling for a steering column, however, because it is desirable that electrical continuity be maintained through a plurality of revolutions of the steering wheel assembly relative to the steering column and because the space available within a steering column assembly for an electrical connector is severely limited by the other devices located therein, such as turn signal indicators and gearshift indicators.

Accordingly, an important object of the present invention is to provide a new and improved electrical coupling for a steering column assembly wherein electrical continuity is maintained between the steering wheel assembly and the steering column through a plurality of revolutions of the steering wheel assembly and which is of a compact and economical construction.

Another object of the present invention is to provide new and improved electrical coupling for use with a device having a rotatable member and a non-rotatable member concentric with the rotatable member and with one of the members including terminal means for connection with an electrical power source, and wherein the electrical coupling includes a pair of flexible electrical connectors each of which has one end fixed to the terminal means of the one member and wrapped a plurality of revolutions upon the one member, and in which the connectors are reversely looped between the members and wrapped a plurality of revolutions upon the other of the members and with the connectors each having its other end fixed to terminal means of the other member whereby the electrical continuity between the members is maintained through a plurality of revolutions of the rotatable member relative to the non-rotatable member.

These and other objects of the present invention are accomplished, in a preferred embodiment, by providing an electrical coupling for use in a steering column mechanism for a motor vehicle. The steering column mechanism has a housing with a steering shaft assembly rotatably supported in a substantially concentric manner therein. The steering column mechanism also includes a steering wheel which is fixedly supported upon the upper end of the steering shaft assembly for manual rotation thereof. A first connector carrier which has electrical terminal means connected to a power source is rigidly affixed to the upper end of the housing, and a second connector carrier which also has terminal means is fixedly supported by the steering wheel and defines an enclosed chamber with the first connector carrier. The second connector carrier is drivingly connected with the steering wheel. Further, a pair of flexible electrical connectors each having one end affixed to the terminal means of the first connector carrier and having a portion thereof wrapped a plurality of revolutions radially inwardly in one direction within the chamber and upon the first connector carrier are provided. The connectors are then reversely looped and each have another portion thereof wrapped a plurality of revolutions in the one direction and radially outwardly upon the second connector carrier. The connectors have their other ends affixed to the terminal means of the second connector carrier to provide electrical continuity therebetween. The connectors wrap upon the first connector carrier and unwrap from the second connector carrier in response to rotation of the steering wheel assembly in the one direction and the connectors wrap upon the second connector and unwrap from the first connector carrier in response to rotation of the steering wheel in the opposite direction. A spacer means is positioned between the wraps of the connectors upon the first and second connector carriers for providing tight wrapping of the connectors thereon whereby the electrical continuity between the rotatable members and the fixed members is maintained through a plurality of revolutions of the steering wheel.

These and other objects of the invention will become more fully apparent from the following description and drawings wherein:

FIG. 1 is a fragmentary view, partly in section and partly in elevation of a steering column mechanism embodying the present invention;

FIG. 2 is a cross-sectional view with portions removed taken along line 2—2 of FIG. 1;

FIG. 3 is a cross-sectional view with portions removed taken along line 3—3 of FIG. 1;

FIG. 4 is a cross-sectional view with portions removed taken along line 4—4 of FIG. 1;

FIG. 5 is a cross-sectional view taken along line 5—5 in FIG. 3; and,

FIG. 6 is a lateral cross-sectional view of a part of the electrical oupling of the present invention.

As representing a preferred embodiment of the present invention, the drawings show an electrical coupling mounted within a steering column mechanism 10. The steering column mechanism 10 comprises an outer mast jacket (not shown) which extends from the upper end of the steering column mechanism 10 to the fire wall (not shown) of an automative vehicle and is supported by conventional means at a position immediately adjacent and below the instrument panel (not shown) of the vehicle. The mast jacket has an annular, cylindrical steering column housing 12 fixedly attached thereto at a position adjacent its upper end. The steering column mechanism 10 also includes a steering shaft assembly 14 which is rotatably supported in a substantially concentric manner within the mast jacket and steering column housing 12. The steering shaft assembly 14 has its lower end received within the housing of the steering gear mechanism (not shown) and has its upper end 15 projecting outwardly from the steering column housing 12. The upper end 15 of the steering shaft assembly 14 has a steering wheel 16 fixedly attached thereto for manual rotation by the operator of the vehicle.

The steering wheel 16 includes a hub 18 which has a central opening 20 which is complementary in shape and which receives the upper end 15 of the steering shaft assembly 14. In this respect, the opening 20 of the hub 18 is complementary with and positioned against a necked down portion 22 of the upper end 15 of the steering shaft assembly 14. The steering wheel 16 also includes a steering wheel spoke member 24 which is also positioned upon the upper end 15 of the steering shaft assembly 14 in an abutting relationship and concentric with the hub 18. The spoke member 24 has fixedly attached thereon a steering wheel trim member 26 and is secured upon the steering wheel shaft assembly 14 along with the hub 18 by a steering wheel attaching nut 28 which is threaded in a manner complementary to the upper end 15 of the steering shaft 14.

The steering column mechanism 10 further includes a turn signal cancel cam 30 which is supported in a concentric manner upon the upper end 15 of the steering shaft assembly 14 at a position adjacent the steering wheel 16. The cam 30 includes a hollow cylindrical projection 32 which extends toward the steering wheel 16 and which is received within a complementary shaped opening 34 in the hub 18 of the steering wheel assembly 16 to drivingly connect the cam 30 therewith. A steering shaft lock plate 36 is also supported in a concentric manner upon the upper end 15 of the steering shaft assembly 14 at a position between the turn signal cancel cam 30 and the hub 18 of the steering wheel 16. The lock plate 36 has the cylindrical projection 32 of the cam 30 extending through a complementary shaped opening 37 therein.

The steering column mechanism 10 also includes an electrical coupling 38 which broadly comprises a first or stationary contact carrier 40 which is fixedly mounted upon the steering column housing 12, a second or rotating contact carrier 42 supported by the stationary contact carrier 40 and which is drivingly connected with the steering shaft assembly 14 and a pair of connectors 46 and 47 which are wrapped a plurality of revolutions between the stationary and rotary contact carriers 40 and 42.

Referring to FIGS. 1 and 3, the stationary contact carrier 40 is a circular, dish-shaped member which has a radially extending bottom wall 48 and an axially extending annular outer side wall 49. The bottom wall 48 has an inner peripheral portion 48a which defines a central opening 50. It should be noted that the stationary contact carrier 40 is of any suitable electrically insulating material, such as plastic. The stationary contact carrier 40 is fastened by any suitable means, herein shown as staking at three positions 52, to a contact carrier plate 54 which is also in the form of a circular dish-shaped member having a central opening 55. Referring to FIGS. 3 and 5, the contact carrier plate 54 includes three axially extending, deflectable fingers 55 which are circumferentially spaced approximately 120° apart about the outer periphery of the plate 54. Each finger 55 has its free end 55a bent radially inwardly with respect to plate 54 and has a radially outwardly extending tang 55b. In assembly of the mechanism 10, the plate 54 is positioned over the upper end of the steering column housing 12 with the bent free ends 55a of the fingers 55 in engagement with the housing 12. When the plate 54 is forced against the upper end of the housing 12, the fingers 55 are deflected radially inwardly and are received within the upper end of the housing 12. As the fingers 55 are received within the housing 12, the tangs 55b pass over three slots 57 circumferentially spaced about the annular, cylindrical housing 12 whereupon the fingers 55 spring radially outwardly and the tangs 55b are received within the slots 57, as shown in FIG. 1, such that the contact carrier plate 54 and the stationary contact carrier 40 are fixedly mounted upon the housing 12 in a concentric manner about the upper end 15 of the steering shaft assembly 14 and between the lock plate 36 and the steering wheel 16. Further, an insulated connector 58, which is electrically connected with a power source (not shown), extends upwardly within the steering column housing 12 to a position immediately adjacent the upper end of the steering column housing 12. The upper end 59 of the connector 58 extends past the contact carrier plate 54 adjacent a rearwardly bent flange 62 which is adjacent the outer periphery of the plate 54. The flange 62 is crimped about the upper end 59 of the connector 58 to secure the connector 58 to the plate 54. The connector 58, as shown in FIG. 5, has a ground wire 63 which is reversely bent from the upper end 59 and thereafter reversely bent about the flange 62 to provide RF shielding. The connector 58 terminates in a pair of wire ends 64 and 65 which extend into a pair of cut-out portions 66 in the wall 56 of the stationary contact carrier 40 to serve as terminal means, as will later be described in more detail.

The second or rotary contact carrier 42 is also a circular member of electrically insulating material, as shown in FIGS. 1 and 2. The rotary contact carrier 42 comprises a radially extending bottom wall 42a which has a central circular opening 67 therein. Immediately adjacent the opening 67, as shown in FIGS. 3 and 5, are three axially extending, arcuately shaped side walls 68 which are circumferentially spaced about the opening 67 and which terminate in a free end 69. Also, each of the free ends 69 of the side walls 68 has an arcuately extending step 69a. Further, the rotary contact carrier 42 includes three axially extending, deflectable fingers 70 which are also circumferentially spaced about the opening 67 and which are located between the side walls 68. The free end of each finger 70 has a tang 72 which projects radially outwardly with respect to the rotary contact carrier 42 and which has an inclined surface 73. When the rotary contact carrier 42 is positioned over the opening 50 of the stationary contact carrier 40 with the inclined surfaces 73 of the fingers 70 engaging the inner peripheral portion 48a and when the carrier 42 is forced against the carrier 40, the fingers 70 are deflected radially inwardly to allow the fingers 70 and side walls 68 to be received within the opening 50. After the tangs 72 pass through the opening 50, the fingers 70 spring radially outwardly to seat the inner peripheral portion 48a of the stationary contact carrier 40 between the tangs 72 of the fingers 70 and the steps 69a of the side walls 68. In this manner, the rotary contact carrier 42 is slidably supported upon the stationary contact carrier 40 for relative rotational movement with respect thereto, while all relative non-rotational movement therebetween is prevented. Referring to FIGS. 1 and 3, the rotary contact carrier 42 also includes a pair of terminals 74 and 75 which are fixedly attached thereon within a pair of recessed or cut-out portions 77 in one of the walls 68. Further, the terminals 74 and 75 have another three-prong terminal means 79 connected therewith and which first extends radially outwardly along the rotary contact carrier 42 and thereafter projects perpendicularly through a protective socket portion 80 toward the steering wheel 16. The terminal means 79 is used to connect the terminals 74 and 75 of the rotary contact carrier 42 with an electrically operated device (not shown), such as an air bag system, which is mounted upon the steering wheel assembly 16. It should be noted that the stationary contact carrier 40 and the rotary contact carrier 42 define therebetween a ring-like, enclosed chamber 81.

Referring to FIGS. 1 and 2, the rotary contact carrier 42 is drivingly connected with the steering wheel 16 via the shaft lock and carrier cover 44 which is a generally circular member having a central opening 82 which is complementary to the upper end 15 of the steering shaft assembly 14. The carrier cover 44 is fixedly mounted to the lock plate 36 by three bolts 84 which extend through three circumferentially spaced holes in the carrier cover 44 and which are received within complementary threaded holes in the lock plate 36. The lock plate 36 and the carrier cover 44 are fixedly supported for rotation with the steering shaft assembly 14 by any suitable means, herein shown as a retaining ring 88 which is received within a circumferentially extending groove 89 in the steering shaft assembly 14, at a position between the lock plate 36 and the hub 18. It should be noted that the carrier cover 44 includes an opening 91 through which the hollow cylindrical projection 32 of the cam 30 extends. Referring specifically to FIG. 1, it should also be noted that the outer peripheral portion of the carrier cover 44 is formed as a circular channel 93 which partially encompasses the stationary and rotaty contact carriers 40 and 42. The carrier cover 44 is drivingly connected with the rotary contact carrier 42 via a rectangularly shaped flange 95 which extends perpendicularly therefrom toward the steering wheel 16 and which defines a rectangular opening 96 within which the terminal means 79 and generally complementary shaped socket portion 80 of the rotary contact carrier 42 are received. It should also be noted that the rectangular opening 96 of the carrier cover provides for electrical connection of the terminal means 79 with other portions of the steering wheel 16.

Now referring to FIGS. 4 and 6, the electrical connectors 46 and 47, which extend between the stationary and rotary contact carriers 40 and 42 to provide electrical continuity therebetween, are shown as flat, elongated, flexible strips 97 of conductive metal, such as copper, which are laminated between a pair of strips 98 of insulating material to form an elongated, flexible tape. The connector 46 has one end 100 attached to the terminal 64 of the stationary contact carrier 40. The connector 47 has one end 102 connected to the terminal 65 of the stationary contact carrier 40. The connectors 46 and 47 extend from the recessed portions 66 into the ring-shaped chamber 81 defined between the contact carriers 40 and 42 and are each shown as having a portion wrapped radially inwardly in a clockwise direction in an overlapping relationship upon the wall 49 of the stationary contact carrier 40 for approximately 2¼ revolutions. At this point, connector 47 is reversely looped about the first spacer 103a of a first plurality of spacers 103 and the connector 46 is wrapped in a clockwise direction an additional 180° whereupon it also is reversely looped upon the first spacer 104a of a second plurality of spacers 104. The other end 105 of the connector 46 is connected with the terminal 74 of the rotary contact carrier 42 and extends from the recessed portion 77 in one of the walls 68. The other end 106 of the connector 47 is similarly connected with the terminal 75 of the rotary contact carrier 42. The connectors 46 and 47 are also shown as each having a portion wrapped radially outwardly in a clockwise direction in an overlapped relationship and upon the side walls 68 of the rotary contact carrier 42 for approximately 2½ revolutions to the reversely looped portion of connector 47. The connector 46 is wrapped an additional 180° therebeyond to its reversely looped portion.

Referring to FIGS. 1 and 4, the first plurality of spacers 103 are positioned within chambers 81 and between the wrappings of the connectors 46 and 47 on the walls 49 and 68 of the stationary and rotary contact carriers 40 and 42. The first plurality of spacers 103 extend from the reversely looped portion of the connector 47 counterclockwise for slightly less than 180°. The second plurality of spacers 104 are similarly positioned and extend from the reversely looped portion of the connector 46 counterclockwise for slightly less than 180°. The spacers 103 and 104 are generally cylindrical or roller-shaped and slide in a circulatory manner within the ring-shaped chamber 81 in response to the wrapping and unwrapping of the connectors 46 and 47, as will later be explained. The spacers 103 and 104 serve to separate the wraps of the connectors 46 and 47 on the wall 49 of contact carrier 40 and the wraps upon the walls 68 of the contact carrier 42. Further, the spacers 103 and 104 assure a tight wrapping of the connectors 46 and 47 upon the walls 49 and 68.

In operation and with the steering column assembly 10 in the position shown in FIG. 4, it should be understood that clockwise rotation of the steeing wheel 16 causes clockwise rotation of the carrier cover 44 and the rotary contact carrier 42. The clockwise rotation of the rotary contact carrier 42 results in an unwrapping of the connectors 46 and 47 from the rotary contact carrier 42 and a wrapping of the connectors 46 and 47 upon the stationary contact carrier 40. It should be seen that this movement of the connectors 46 and 47 causes the reversely looped portion of the connector 47 to advance in a clockwise manner away from the first spacer 103a and to abut the last spacer 104b of the second plurality of spacers 104. This, along with the force of gravity, serves to slide the second plurality of spacers 104 in a clockwise direction and circulatory manner within the chamber 81. Similarly, the reversely looped portion of the connector 46 abuts the last spacer 103b of the first plurality of spacers 103 which serves to slide the first plurality of spacers 103 in a clockwise direction and in a similar circulatory manner. Counterclockwise rotation of the steering wheel 16 causes an unwrapping of the connectors 46 and 47 from the stationary contact carrier and a wrapping of the connectors 46 and 47 upon the rotary contact carrier 42. The movement of the connectors 46 and 47 under these circumstances causes the reversely looped portion of the connector 47 to engage the first spacer 103a of the first plurality of spacers 103 which serves to slide the first plurality of spacers 103 in a counterclockwise direction and in a circulatory manner within the chamber 81. Similarly, the reversely looped portion of the connector 46 engages the first spacer 104a of the second plurality of spacers 104 which serves to slide the second plurality of spacers 104 in a counterclockwise direction and in a similar circulatory manner. It should be noted that the electrical continuity between the rotary contact carrier 42 and the stationary contact carrier 40 is maintained through a minimum of two complete revolutions in either a clockwise or counterclockwise direction from the position shown in FIG. 4. It should also be understood that the number of revolutions through which electrical continuity can be maintained between the contact carriers 40 and 42 can be significantly varied by increasing or decreasing the lengths of the connectors 46 and 47 and hence, number of wraps upon the contact carriers 40 and 42.

The foregoing disclosure relates to only one embodiment of the invention which may be modified within the scope of the appended claims.

What is claimed is:

1. An electrically coupled device, comprising: a rotatable member and a non-rotatable member concentric with said rotatable member and with one of said members having terminal means for connection with an electrical power source, said rotatable and non-rotatable members defining a chamber therebetween; a pair of electrical connectors each having one end fixed to said terminal means of said one member and being tightly wrapped in an overlapping relationship a plurality of complete revolutions upon said one member and within said chamber, said connectors being reversely looped between said members and being tightly wrapped in an overlapping relationship a plurality of complete revolutions upon the other of said members and within said chamber, said connectors each having their other ends fixed to terminal means upon said other member to provide electrical continuity between said members, said connectors wrapping tightly upon said non-rotatable member and unwrapping from said rotatable member in response to rotation of said rotatable member in said one direction and said connectors wrapping tightly upon said rotatable member and unwrapping from said non-rotatable member in response to rotation of said rotatable member in said opposite direction whereby said electrical continuity between said members is maintained through a plurality of complete revolutions of said rotatable member relative to said non-rotatable member; and a plurality spacers between the wraps of said connectors upon said rotatable and non-rotatable members and about which said connectors are reversely looped providing for and maintaining a tight wrapping of said connectors upon said rotatable and non-rotatable members.

2. An electrically coupled steering column mechanism for a motor vehicle, comprising: a housing, a steering wheel fixedly supported upon the upper end of a steering shaft assembly which is rotatably supported within said housing; a first carrier supported upon the upper end of said housing and a second carrier being rotatably supported and drivingly connected with said steering wheel, said first carrier having terminal means connected to a power source and said second carrier having terminal means, said first and second carriers defining an enclosed chamber therebetween; a pair of flexible electrical connectors each having one end fixed to said terminal means of said first carrier and having a portion thereof tightly wrapped radially inwardly in an overlapping relationship a plurality of complete revolutions in one direction upon said first carrier, said connectors being reversely looped in opposite positions within said chamber and having another portion thereof tightly wrapped radially outwardly in an overlapping relationship a plurality of revolutions in said one direction upon said second carrier, said connectors having their other ends fixed to said terminal means of said second carrier to provide electrical continuity between said carriers, said connectors wrapping tightly upon said first carrier and unwrapping from said second carrier in response to rotation of said second carrier in said one direction and said connectors wrapping tightly upon said second carrier and unwrapping from said first carrier in response to rotation of said second carrier in said opposite direction; a plurality of spacers between the wraps of said connectors on said first and second connector carriers for providing tight wrapping of said connectors upon said first and second connector carriers whereby said electrical continuity between said carriers is maintained through a plurality of complete revolutions of said second carrier relative to said first carrier.

3. An electrically coupled steering column mechanism for a motor vehicle, comprising; a housing, a steering shaft assembly rotatably supported in a substantially concentric manner within said housing; a steering wheel fixedly supported upon the upper end of said steering shaft assembly for manual rotation thereof; a first circular connector carrier having a disc portion with an annular side wall projecting therefrom adjacent the outer periphery of said disc portion, said first connector carrier being rigidly connected with the upper end of said housing immediately adjacent said steering wheel and having electrical terminal means connected to a power source; a second circular connector carrier having a disc portion with an annular side wall projecting therefrom inwardly of the outer periphery of said disc portion, said second connector carrier being rotatably supported upon said first connector carrier between said steering wheel and said first connector carrier and defining with said first connector carrier a ring-shaped chamber therebetween, said second connector carrier having terminal means and being drivingly connected with said steering wheel; a pair of flexible electrical connectors each having one end fixed to the terminal means of said first connector carrier and having a portion thereof wrapped radially inwardly in an overlapping relationship a plurality of revolutions in a clockwise direction within said chamber and upon said annular side wall of said first connector carrier, said connectors being reversely looped at opposite locations within said chamber and having another portion there of wrapped radially outwardly in an overlapping relationship a plurality of revolutions in a clockwise direction within said chamber an upon said annular side wall of said second connector carrier, said connectors having their other ends fixed to the terminal means of said second connector carrier to provide electrical continuity therebetween, said connectors wrapping upon said first connector carrier in response to rotation of said steering wheel in said one direction and said connectors wrapping upon said second connector and unwrapping from said first connector carrier in response to rotation of said steering wheel in said opposite direction; a plurality of roller spacers circulating within said chamber in response to wrapping and unwrapping of said connectors and separating the wraps of said connectors on said first and second connector carriers to assure tight wrapping of said connectors upon said first and second connector carriers; whereby said electrical continuity between the rotatable members and the non-rotatable members is maintained through a plurality of revolutions of said steering wheel.

* * * * *